United States Patent
Corem et al.

(10) Patent No.: US 7,039,259 B2
(45) Date of Patent: May 2, 2006

(54) FIBER OPTICAL GAIN EQUALIZER

(75) Inventors: Yossi Corem, Beit Shemesh (IL);
Seongwoo Suh, Florham Park, NJ (US);
Gil Cohen, Livingston, NJ (US)

(73) Assignee: Xtellus, Inc., Florham Park, NJ (US)

( * ) Notice: Subject to any disclaimer, the term of this patent is extended or adjusted under 35 U.S.C. 154(b) by 0 days.

(21) Appl. No.: 10/760,107

(22) Filed: Jan. 16, 2004

(65) Prior Publication Data

US 2005/0008288 A1 Jan. 13, 2005

Related U.S. Application Data

(63) Continuation of application No. PCT/IL02/00167, filed on Mar. 4, 2002.

(30) Foreign Application Priority Data

Jul. 18, 2001 (IL) .......................... 144434

(51) Int. Cl.
*G02F 1/035* (2006.01)
(52) U.S. Cl. .............. 385/3; 385/39; 359/279
(58) Field of Classification Search ............. 385/3, 385/38, 39, 50; 359/245, 249, 279, 578
See application file for complete search history.

(56) References Cited

U.S. PATENT DOCUMENTS

| | | | | |
|---|---|---|---|---|
| 5,459,576 A | * | 10/1995 | Brunfeld et al. | 356/520 |
| 5,841,583 A | * | 11/1998 | Bhagavatula | 359/577 |
| 6,034,812 A | * | 3/2000 | Naito | 359/337.11 |
| 6,046,854 A | * | 4/2000 | Bhagavatula | 359/577 |
| 6,144,488 A | * | 11/2000 | Okuno | 359/337.12 |
| 6,553,158 B1 | * | 4/2003 | Jimenez | 385/15 |
| 6,667,824 B1 | * | 12/2003 | Bayart et al. | 359/254 |
| 6,847,742 B1 | * | 1/2005 | Sorin | 385/7 |
| 2003/0021526 A1 | * | 1/2003 | Bouevitch | 385/24 |
| 2004/0120683 A1 | * | 6/2004 | Cohen | 385/140 |

* cited by examiner

*Primary Examiner*—Sung Pak
(74) *Attorney, Agent, or Firm*—Darby & Darby

(57) ABSTRACT

A fiber optical device, whose wavelength profile can be dynamically controlled in real time by the application of control voltages. The device can be used as a fiber optical gain equalizer or a wavelength selective filtering device which is compact, polarization insensitive, and of low manufacturing costs. The device comprises a stepped transparent substrate, through which the input beam is passed. Within the optical paths of the stepped regions of the substrate, electronically variable phase shifting elements are located, each operative to change the phase of the light passing through its associated step, and thus effectively adding tunability to the height of each step. Planar liquid crystal elements may be used as these elements. The elements may be pixelated, each pixel preferably affecting the phase of the light passing through a fraction of the area of the associated step, such that the interference so can be used to vary the transmission through that step. The pixels thus effectively add tunability to the area of each step. Electronic control of the height and area of each step enables the generation and dynamic control of complex transmission profiles.

25 Claims, 5 Drawing Sheets

FIBER OPTICAL GAIN EQUALIZER

FIELD OF THE INVENTION

The present invention relates to the field of gain equalizers using stepped substrate phase shifter techniques for implementing the wavelength selective function, especially for use in fiber optical applications.

BACKGROUND OF THE INVENTION

Gain equalizers are important components in fiber optical communication systems. One of the main functions of an optical gain equalizer is to bring all of the separate wavelength signals in a data transmission to the same amplitude, in order to optimize system spectral power budget. The functional requirements of an optical gain equalizer for use in such a system are that it should vary the intensity of the light transmitted as a function of the wavelength of the light, and without appreciably altering the spatial, temporal, or polarization distribution of the light beam.

Many types of optical gain equalizers have been described in the prior art. In U.S. Pat. No. 6,144,488, to H. Okuno, for "Optically Amplifying Device with Gain Equalizing Function", there is described a semiconductor optical amplifier, in which the gain for each wavelength is varied to provide gain equalization functionality. In U.S. Pat. No. 6,034,812, to T. Naito, for "Gain Equalizer and Optical Transmission System having the Gain Equalizer" there is described a system including three cascaded gain equalizers, the first having a maximum loss at or near the optical amplifier's peak gain, and the others having periodic loss characteristics, arranged such that they fall at or near a wavelength giving one of two gain peaks remaining when the gain characteristic of the optical amplifier the has been equalized by the first equalizer only.

In co-pending Israel Patent Application No. 142,773, hereby incorporated by reference in its entirety, there is described a multichannel gain equalizer utilizing an array of electronically variable optical attenuators. The input optical signal, composed of a number of separate signals, each at its own characteristic wavelength. The input signal is input into a demultiplexer, which separates the individual wavelength components of the signal into n separate channels, $\lambda_1$, $\lambda_2$, $\lambda_3 \ldots \lambda_n$, one for each wavelength range. Such a demultiplexer is typically constructed of a dispersive grating. Each of these channels is input into its own variable optical attenuator, $VOA_1$, $VOA_2$, $VOA_3$, ... $VOA_n$. The levels of the signals in each channel 1, 2, 3, ... n, are detected by means of in-line signal detector elements, and a feedback signal from each detector element is used to control the level of attenuation of each VOA. The resulting signals from all of the separate channels are thus brought to the same level, and are recombined in a multiplexer unit, into a multichannel, gain-equalized, output signal.

Though the last described gain equalizer may be simpler in design, and, when constructed on an integrated optics substrate using an array of integrated variable optical attenuators, more compact than many other prior art gain equalizers, it still consists of a significant number of components, thereby making its construction comparatively complex.

Gain equalizers, since they are operative to manipulate the various wavelength bands of the light signal to be equalized, generally utilize a wavelength selective filter device for fulfilling their function. In U.S. Pat. No. 5,841,583 for "Multi-path interference filter" and in U.S. Pat. No. 6,046,854 for "Multi-path interference filter with reflective substrate", both to V.A.Bhagavatula and both hereby incorporated by reference in their entirety, there are described filter devices based on interference effects between different parts of the cross section of a beam which traverse different optical paths, thereby generating the desired phase difference between them.

Two types of filter are described in the Bhagavatula patents. In the first type, the phase shifts are generated by means of an optical path length difference generator formed either by a stack of stepped reflective surfaces that are spaced apart in the direction of beam propagation by at least one nominal wavelength, for varying the physical path lengths between the different parts of the cross section of the beam, or alternatively, in a transmissive version, by using a stepped spacer plate instead of the differently spaced reflective surfaces to generate the path difference. This first type has the disadvantage that the stepped reflective surfaces or the spacer plate are fixed, and no dynamic control of the filtering function is therefore possible. The spectral profile of the filter is thus fixed at the shape defined by the steps used in the filter's construction.

In the second type, the optical path length generator includes a spacer section that is divided into elements having different refractive indices for varying the optical path lengths of the different parts of the cross section of the beam. This type is described in a cylindrical form that can be part of a single mode optical fiber. According to this embodiment, dynamic tuning of the filter's spectral response may be accomplished by changing the optical path lengths by means of electro-optic effects, which vary the refractive index of the material along the optical path length. A controlling electric field is applied by means of jacket electrodes enveloping the electro-optical materials in the optical path. Liquid crystal materials are suggested as a suitable electro-optical material for this purpose.

However, there are two disadvantages to this embodiment. Firstly, it is difficult to implement the geometry proposed, whereby the liquid crystal material is contained in bulk form along the length of the optical path of the axial device. Liquid crystals are usually provided as thin planar layer devices, sandwiched between two electrode-coated cover glasses. Secondly, in the geometry shown, since control is performed from the outside of the device, enveloping the whole of the device, only one of the two interfering optical paths can be made of material which is dynamically controllable at any time, and control of the spectral profile of the filter is thus limited.

There thus exists an important need for an electronically controllable optical filter device, of simple construction and of wide spectral versatility. There also exists a need for an electronically controllable optical gain equalizer of simple construction which can perform spectral signal processing on an optical signal input to it, including dynamic gain equalization.

The disclosures of each of the publications mentioned in this section and in the other sections of the specification, are hereby incorporated by reference, each in its entirety.

SUMMARY OF THE INVENTION

The present invention seeks to provide a new fiber optical device, whose wavelength profile can be dynamically controlled in real time by the simple application of control voltages. In addition, the present invention seeks to provide a new fiber optical gain equalizer, using such devices, which is compact, polarization insensitive, simple in construction and operation, and of low manufacturing costs.

The devices of the various preferred embodiments of the present invention differ from the above described prior art filter devices based on stepped substrates in a number of ways. In the prior art devices, the wavelength profile of the filter can be designed to have only a single predefined shape, since the only parameters available for this design are the step heights, or their refractive index, which effectively makes the same contribution as the height to the filter performance, and the step areas, all of which are fixed at the time of manufacture of the filter. Any inaccuracy in design or manufacturing procedure results in a profile different from that desired. Furthermore, the profile is fixed. In the present invention, both the step areas and their heights can be effectively varied dynamically, such that if the device is a fixed filter, fine tuning can be performed after manufacture to correct for design or manufacturing inaccuracies. Alternatively and preferably, a true dynamic filter function can be obtained, capable of being varied in real time with the changing needs of the application.

There is thus provided in accordance with a preferred embodiment of the present invention, a method of constructing a gain equalizer or a wavelength selective filtering device consisting of a stepped transparent substrate having part of the area of its surface stepped and part planar. A collimated beam carrying the signal whose spectral profile is to be processed, is transmitted through this stepped substrate. According to a preferred method of the present invention, the spectral profile of the signal as a function of wavelength, can be split into specific wavelength components by means of Fourier analysis. Because of the interference effects between the light transmitted through a step and that transmitted through the unstepped surface of the substrate, wavelength discrimination is produced by each step, depending on its height and area, which together determine the shape of the interference pattern obtained. A superposition of such interference patterns, each associated with one Fourier component of the spectral profile to be processed, is able to change the level of each wavelength component of the signal transmitted by the gain equalizer or the wavelength selective filtering device, and thus to process the spectral profile of the signal.

According to a further preferred embodiment of the present invention, within the optical paths of at least some of the stepped regions of the substrate, there are located phase shifting elements, each operative to change the phase of the light passing through its associated step. The phase shifting elements are electronically controllable and may preferably be planar liquid crystal elements. Each phase shifting element effectively adds or subtracts to the phase shift of the light passing through its associated step, and thus effectively adds tunability to the height of each step, thus enabling electronic selection of the period of the Fourier element of the signal associated with that step.

According to an additional preferred embodiment of the present invention, at least some of the stepped phase shifting elements may be pixelated, each pixel preferably affecting the phase of the light passing through a fraction of the area of the associated step. The pixel structure is generally such that the phase of the light passing through half of the area of the pixelated step is typically controlled. When the phase difference generated by the pixels is such that the total phase differences between the optical paths in the two halves of the area of the associated step is 180°, destructive interference occurs, and no transmission is effected through that step. The level of transmission allowed through a given step can thus be controlled by the anti-phase components added to the optical path of the step by the pixelated phase shifting elements. The pixels thus effectively add tunability to the area of each step, thus enabling electronic selection of the amplitude of the Fourier element of the signal associated with that step.

According to the above-mentioned embodiment of the present invention, there is provided a wavelength selective device which is capable of processing the profile of an input optical signal, by means of electronic control of both the period of the Fourier components of the signal and the amplitude of the Fourier components of the signal, each Fourier component being associated with one step of the device.

In accordance with a further preferred embodiment of the present invention, there is also provided an optical device comprising an input fiber, an output fiber, and a substrate comprising at least one electronically controllable phase-shifting step disposed in part of the optical path between the input fiber and the output fiber, such that the optical interference between light in those parts of the optical path containing the at least one phase shifting step and those parts not containing the at least one phase shifting step, results in wavelength dependent transmission through the device. In this optical device, the phase shift in the at least one phase-shifting step may preferably be selected such that the optical transmission of the device has a predetermined spectral profile. The device may also preferably include a variable phase shifter controlled by means of an applied signal, in series with at least one of the at least one phase shifting steps, such that variation of the applied signal causes the predetermined spectral transmission to change. The variable phase shifter may preferably be pixelated such that it shifts the phase of light passing through at least part of the above-mentioned optical cross section of the step. In accordance with a further preferred embodiment of the present invention, the variable phase shifter is a liquid crystal device, and more preferably, a planar liquid crystal device.

In accordance with still more preferred embodiments of the present invention, the input and the output fibers of the above-described device may be disposed such that light passes between them either by transmission or after undergoing reflection on an incorporated reflecting surface.

Alternatively and preferably, the device can incorporate a circulator and a reflecting surface, with the input and the output fibers connected to two ports of the circulator, and the reflecting surface disposed at a third port of the circulator.

Any of the above-described optical devices can, according to still more preferred embodiments of the present invention, be operative as a gain equalizer.

There is even further provided in accordance with another preferred embodiment of the present invention, an optical gain equalizer including an input fiber for inputting an input optical signal, an output fiber for outputting an output optical signal, and a substrate having at least one stepped area with predefined parameters disposed in the optical path between the input fiber and the output fiber.

The optical gain equalizer may preferably also include a variable phase shifting element, controllable by means of an applied signal, the phase shifting element being disposed across the optical cross section of a stepped area of the substrate. The variable phase shifting element may preferably be pixelated such that it shifts the phase of light passing through part of the cross section. The controllable phase shifting element may preferably be, in accordance with still another preferred embodiment of the present invention, a liquid crystal device.

Furthermore, in accordance with still more preferred embodiments of the present invention, the input and the output fibers of the above-described device may be disposed such that light passes between them either by transmission or after undergoing reflection on an incorporated reflecting surface.

Alternatively and preferably, the optical gain equalizer can incorporate a circulator and a reflecting surface, with the input and the output fibers connected to two ports of the circulator, and the reflecting surface disposed at a third port of the circulator.

There is further provided in accordance with still another preferred embodiment of the present invention an optical gain equalizer as described hereinabove, and also including a channel monitor, from which is obtained the applied signal according to the spectral profile of the output optical signal, such that the optical gain equalizer modifies the spectral profile of the input optical signal dynamically. In such an embodiment, the optical gain equalizer may preferably be operative to compensate for changes in the spectral profile of the input signal dynamically.

In accordance with a further preferred embodiment of the present invention, in this optical gain equalizer, the applied signal may preferably be made dependent on the effective wavelength and amplitude of that of the Fourier components of the spectral profile of the output optical signal, which is associated with the at least one stepped area of the substrate.

There is further provided in accordance with yet another preferred embodiment of the present invention, a method of gain equalizing the spectral transmission profile of an optical path, comprising the steps of providing an input signal on an input fiber of the path, providing an output signal on an output fiber of the path, disposing a substrate having at least one stepped area with predefined parameters between the input fiber and the output fiber, and predefining the parameters of the at least one stepped area such that the substrate is operative as a gain equalizer. The parameters may preferably be at least one of the optical cross sectional area and the height of the stepped area.

According to a further preferred embodiment, the method may also comprise the additional step of disposing a variable phase shifting element, controllable by means of an applied signal, across the optical cross section of the at least one stepped area of the substrate. The variable phase shifting element may preferably be pixelated such that it shifts the phase of light passing through at least part of the cross section. In any of the above-mentioned methods, the controllable phase shifting element may preferably be a liquid crystal device. Furthermore, the input fiber and the output fibers may be so disposed such that light passes by transmission between them.

According to further preferred embodiments of the present invention, the method may also comprise the additional step of providing a reflecting surface, and disposing the input fiber and the output fibers such that light undergoes reflection between them. Alternatively and preferably, a circulator and a reflecting surface may be provided, and the input fiber and the output fibers connected to two ports of the circulator, and the reflecting surface at a third port of the circulator.

In any of the above-mentioned methods, the applied signal may preferably be obtained from a channel monitor according to the spectral profile of the output optical signal, such that the optical device modifies the spectral profile of the input optical signal dynamically. Furthermore, the optical device may be adapted to compensate for changes in the spectral profile of the input signal dynamically. In this method, the applied signal may be made to be dependent on the effective wavelength and amplitude of that of the Fourier components of the spectral profile of the output optical signal, which is associated with the at least one stepped area of the substrate.

There is even further provided in accordance with a preferred embodiment of the present invention, a method of modifying the spectral profile of an input optical signal to a predetermined profile, including the steps of (i) determining the effective wavelengths and amplitudes of Fourier components of the spectral profile of the input optical signal, (ii) determining the effective wavelengths and amplitudes of Fourier components of the predetermined spectral profile, (iii) calculating a transfer function according to the ratio of the Fourier components of the spectral profile of the input optical signal to those of the predetermined profile, (iv) providing a substrate having a plurality of stepped areas, one stepped area for each determined Fourier component, and (v) passing the optical signal through the substrate, wherein the height of each of the stepped areas is predetermined to match the wavelength of the transfer function which is associated with its stepped area, and the area of each of the stepped areas is predetermined to match the amplitude of the transfer function associated with its stepped area.

The above-described method may also preferably include the step of providing a variable phase shifter disposed across the cross section of at least one of the stepped areas, and wherein variation of the phase shifter varies the wavelength of that component of the transfer function associated with that stepped area. In addition, the variable phase shifter may preferably be pixelated, and the generation of differential phase shifts in anti-phase by the pixels be utilized to vary the amplitude of that component of the transfer function associated with that stepped area.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
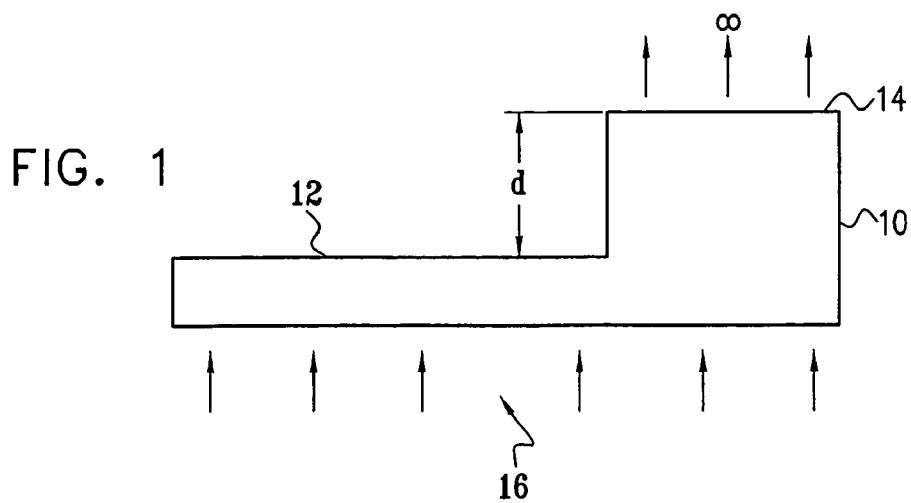
FIG. 1 illustrates schematically a stepped substrate used in the construction of a prior art optical filter.

Reference is now made to FIG. 1, which illustrates schematically a stepped substrate 10, as is known in the prior art. The substrate, of total area A, is made of a transparent optical material of refractive index n. The substrate has a step 14 of area a, and of height d, projecting from the overall plane of its surface 12.

When a plane wave of light 16 of wavelength $\lambda$ is projected through the substrate, then the light passing through the step undergoes a phase retardation $\theta$, relative to that not traversing the step, given by:

$$\theta = 2\pi/\lambda \cdot (n-1)d \quad (1)$$

The total transmitted intensity at optical infinity, of the light passing through the stepped substrate is then given by the expression:

$$I = |(A-a) + a\,\exp(i\theta)|^2 \quad (2)$$

As is observed from incorporation of equation (1), the transmission is thus wavelength dependent. It is to be understood that the intensity obtained at optical infinity can be transformed to a near field plane by use of a converging lens, as will be illustrated in the complete device embodiments hereinbelow.

Figure 2:
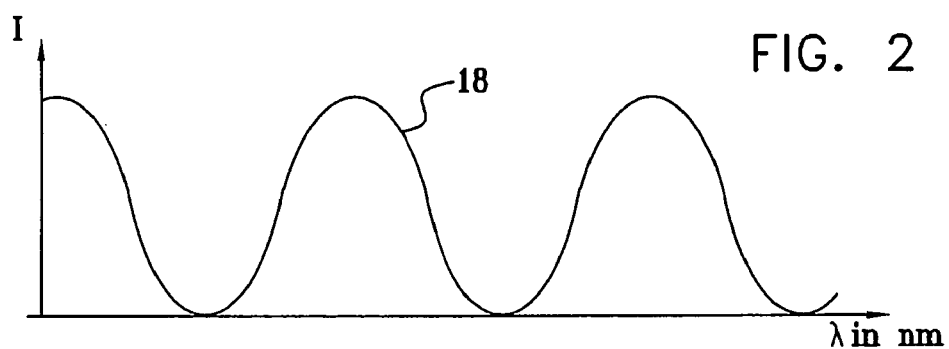
FIG. 2 is a graph of transmitted light intensity as a function of wavelength, resulting from the interference of the components of an incident beam passing through the separate stepped and unstepped sections of the prior art substrate of FIG. 1.

Reference is now made to FIG. 2, which is a graph 18 of the transmitted light intensity I obtained at optical infinity as a function of the wavelength $\lambda$ of the light, resulting from the interference of the components of the incident beam passing through the separate stepped and unstepped sections of the substrate shown in FIG. 1. The form of the graph, well-known from optical interference phenomena, arises because of the cyclic nature of the interference with phase shift, the intensity repeating itself at every additional multiple of $2\pi$ of phase difference between the interfering beams. This can be converted by means of equation (1) into wavelength dependent intensity changes. The number of periods within a given wavelength range is determined by the height of the step, the greater the height, the larger the number of periods in a given wavelength range.

The transmission modulation as a function of the phase retardation angle $\theta$ is given by:

$$T = I/|A|^2 = 1 - 2c(1-c) \cdot [1 - \cos(\theta)] \quad (3)$$

where $c = a/A$ is the area of the step as a fraction of the complete substrate area. The transmission modulation can vary between a value of 1, when $\theta = 2N\pi$, N being any integer, including zero in which case there is no phase retardation, and a minimum value, which can be 0 if $c = 0.5$, i.e. if the step covers half of the substrate.

Figure 3:
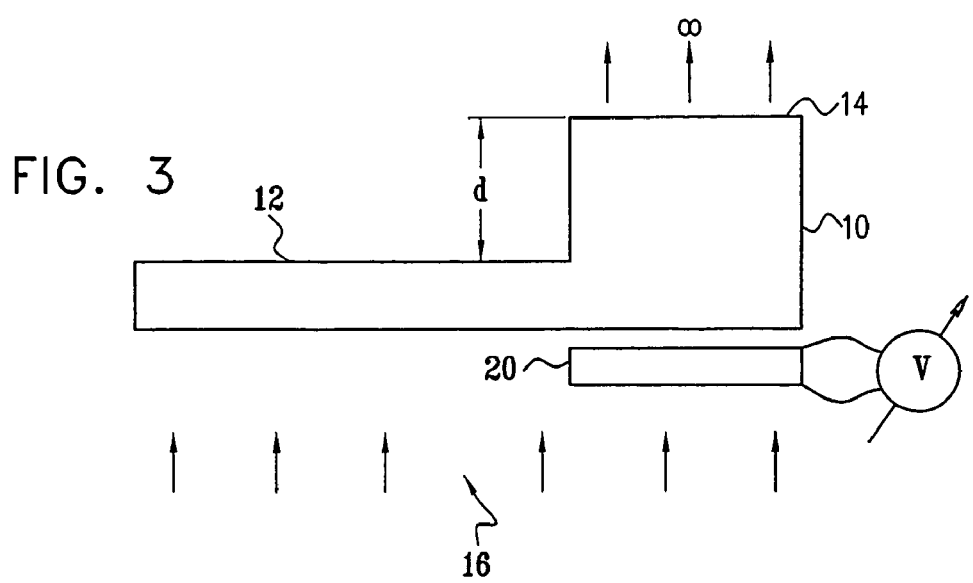
FIG. 3 shows a stepped substrate, constructed and operative according to a preferred embodiment of the present invention, with a transmissive liquid crystal element in the optical path of a step.

Reference is now made to FIG. 3, which shows a stepped substrate according to a preferred embodiment of the present invention, in which a transmissive liquid crystal element 20 is located in the optical path of the step 14. In the above-mentioned U.S. Pat. No. 6,046,854, such prior art stepped substrates are described as being in the form of radially symmetric steps in a circular element located in the optical path. According to preferred embodiments of the present invention, the steps may be rectilinearly disposed on the substrate, this geometry often being more suitable for use with commercially available liquid crystal elements. Though the liquid crystal element is shown adjacent to the flat bottom of the substrate, it is to be understood that it could preferably be on top of the step, or elsewhere in the optical path of the light signal passing through the step. The phase shift of the light passing through the liquid crystal element can be varied by varying the voltage V applied to the electrodes of the liquid crystal. The electrodes and their addressing leads are transparent, so as not to interfere with the optical transmission of the device. Though this preferred embodiment has been described using a liquid crystal device as the variable phase shifting device, a liquid crystal element being a convenient, planar, low cost and widely available element, it is possible to use any alternative element, capable of applying a continuously variable phase change to the light passing through the step path, according to the voltage V applied to the phase shifter. Examples of such elements include those based on the Faraday effect, the magneto-optical effect, the electro-optical effect, or any other suitable opto-electrical effect. Though a liquid crystal element is generally described throughout this specification, as being used in the construction of or the operation of the various embodiments of the invention, it is to be understood that the invention is not meant to be limited specifically to embodiments using a liquid crystal element for the described effect or function, but that any suitable phase shifting element can be equally well used.

Figure 4:
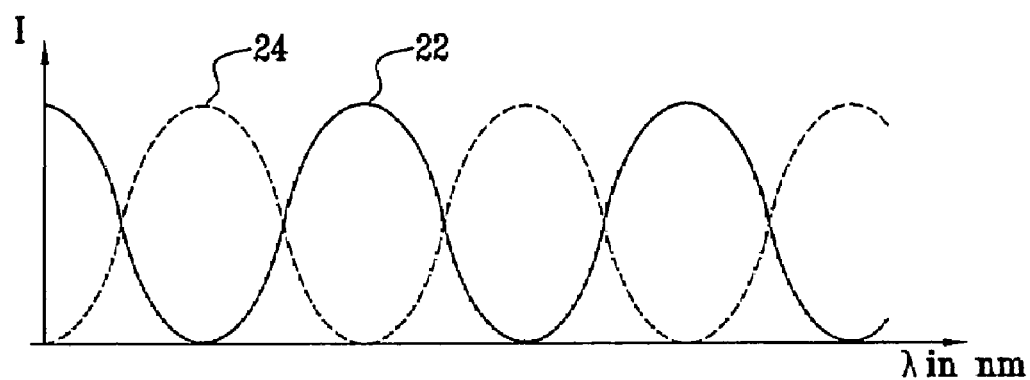
FIG. 4 is a graph of the transmitted light intensity as a function of wavelength, as a result of the interference of components of the incident beam passing through stepped and unstepped sections of the substrate shown in FIG. 3.

Reference is now made to FIG. 4, which is a graph typical of the transmitted light intensity I obtained at optical infinity as a function of the wavelength $\lambda$ of the light, as a result of the interference of the components of the incident beam passing through the two separate stepped and unstepped sections of the substrate shown in FIG. 3. When no voltage is applied to the liquid crystal device, the intensity is typically that shown in curve 22. When voltage is applied, the transmission curve 24 is shifted along the wavelength axis according to the voltage applied. A device is therefore formed, according to preferred embodiments of the present invention, whose optical transmission can be varied as a function of wavelength according to an applied voltage signal.

Figure 5:
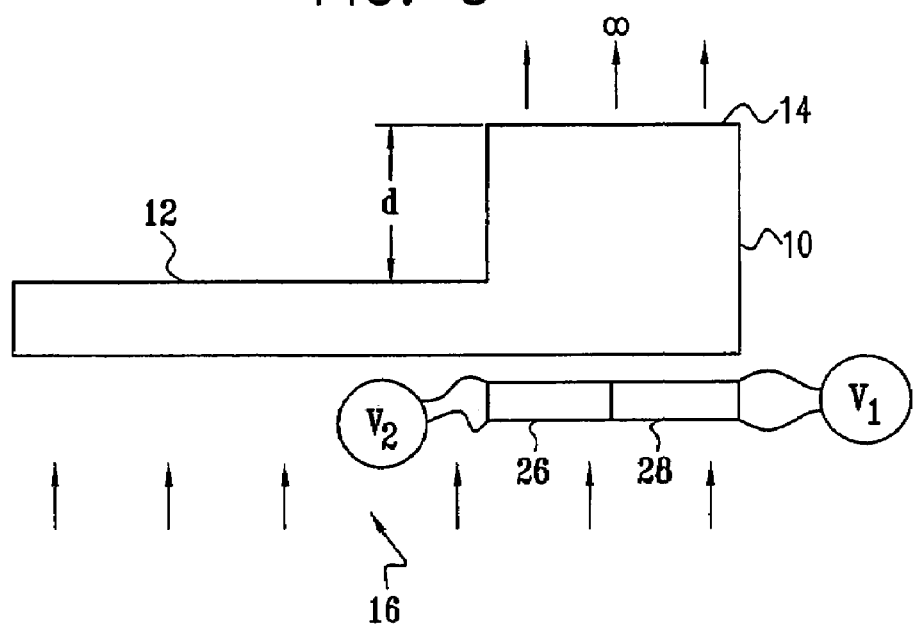
FIG. 5 is a schematic illustration of the device shown in FIG. 3, but with its phase shifting element divided into separate pixels, each independently controllable by its own voltage signal applied to the electrodes of each pixel.
Figure 6:
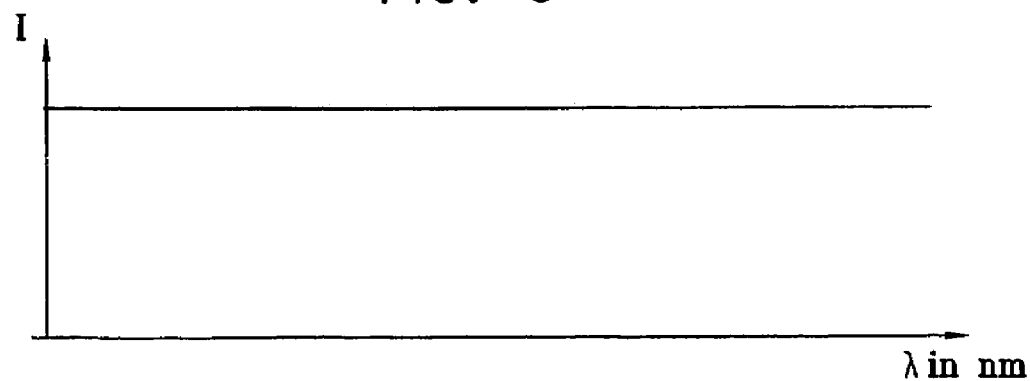
FIG. 6 is a graph of the transmitted light intensity as a function of wavelength, as a result of the interference of components of the incident beam passing through stepped and unstepped sections of the substrate shown in FIG. 5, when the pixels are driven such as to introduce phase shifts differing by $\pi$.

Reference is now made to FIG. 5, which is a schematic illustration of the device shown in FIG. 3, but wherein the phase shifting element 20 is divided preferably into two separate pixels, 26, 28, each independently controllable by its own voltage signal applied to the electrodes of each pixel. Each of the pixels have the same overall area, each intercepting half of the beam passing through the step 14. When the two pixels are driven such as to introduce into the optical paths through the step, phase shifts differing by $\pi$, destructive interference of the light passing through the step results, and the step effectively disappears. The result at optical infinity is then uniform illumination, as shown in FIG. 6, resulting from the light transmitted through the uniform remainder of the surface 12 of the substrate. The level of illumination is determined by the ratio, c, of the step with respect to the rest of the substrate, and expressed fractionally, is $(1-a/A)^2$, where a is the area of step 14, and A is the area of the remainder of the substrate 12.

When the phase shift between the two pixels 26, 28 is zero, the step behaves optically uniformly, the phase shift through it being the result of its own optical path length, and the additional phase shifts introduced by the phase shifting element 20. The resulting interference pattern at infinity is thus similar to that shown in FIG. 4. Though the embodiment illustrated in FIG. 5 shows the electrodes divided into two pixels, it is to be understood that the invention operates equally with any other number of pixels, driven such that half of the light passing through the step has a different phase shift applied to it than the other half.

A more rigorous derivation of the interference effects of a single step structure in a plane substrate, with a double pixelated phase shifter is now given. The phase-shifting voltage can either be commonly applied to both pixels, hence adding a common phase shift of angle $\Phi$ to the light transmitted through the step, this phase shift being added to the phase retardation $\theta$ of the step, or alternatively, the pixels may be driven with a relative phase difference between them, $\phi$ such that the phases in the two pixelar paths are respectively shifted by $\Phi+\phi$ and $\Phi-\phi$.

The total transmitted intensity at optical infinity is then given by:

$$I=|(A-a)+\tfrac{1}{2}a\exp[i(\theta+\Phi+\phi)]+\tfrac{1}{2}a\exp[i(\theta+\Phi-\phi)]|^2 \quad (4)$$

where $\phi$ is the relative phase shift between the two pixelated areas of the phase shifter, and $\Phi$ is the common phase shift introduced by the two pixels working in phase. The transmission factor is now given by:

$$T=1-2c+c^2(1+\cos^2\phi)+2c(1-c)\cos(\theta+\Phi)\cos\phi \quad (5)$$

Thus the modulation can be shifted in wavelength through the commonly applied phase shift $\theta$ added to the phase retardation $\theta$, $\theta$ being the only phase shift angle which is wavelength dependent, or reduced in magnitude through the differential phase shift $\theta$. Since $\theta$ arises from the phase shifting element, which is assumed to have a uniform response over the wavelength range of interest, it does not directly affect the position of the transmission curve, only its magnitude.

Figure 7:
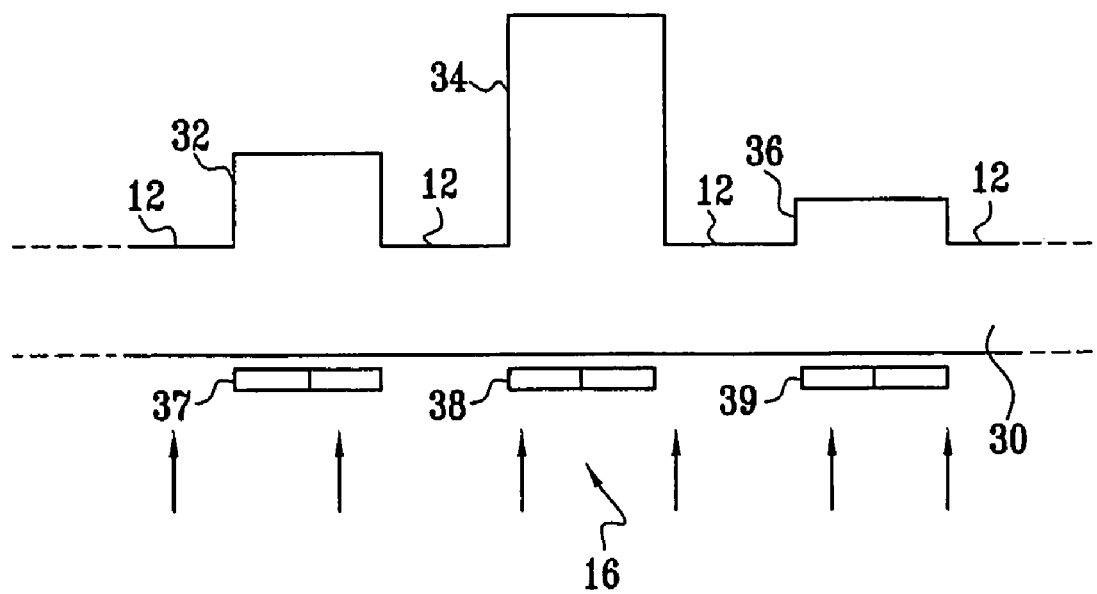
FIG. 7 is a schematic drawing of a stepped substrate similar to that of FIG. 3, but incorporating a number of steps, each of different height.

Reference is now made to FIG. 7, which is a schematic drawing of the stepped substrate 30 similar to that of FIG. 3, but incorporating, according to a preferred embodiment of the present invention, a number of steps, each of different height. In the preferred embodiment shown in FIG. 7, three steps 32, 34, 36 are shown, but it is understood that the substrate may incorporate any practical number of steps, commensurate with the size of the substrate and the requirement stated hereinbelow regarding limitation of the area of the steps as a fraction of the total substrate area. Each of the steps produces a different interference effect of the incident light 16 passing through that step with the light passing through the unstepped portions 12 of the substrate. Beneath each step is located a pixelated controllable phase shifting device, 37, 38, 39.

Figure 8:
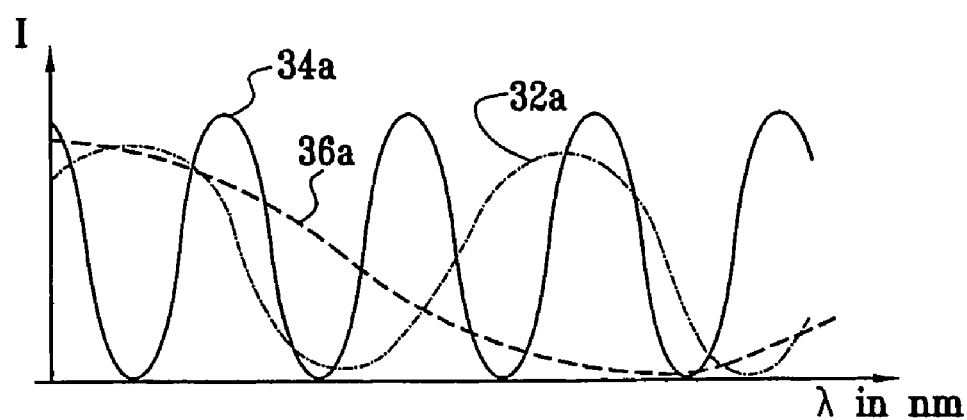
FIG. 8 is a graph showing the effect on overall transmission of the stepped substrate for each of the three steps shown in the embodiment of FIG. 7.

The effect on the overall transmission curve of the stepped substrate for each of the three steps shown in the embodiment of FIG. 7 is illustrated in the graph shown in FIG. 8. Each of the steps of FIG. 7, having a different height, results in a different transmission modulation characteristic, and the curves are labeled, 32a, 34a and 36a, according to the labeling of the steps which result in them. When the step is large, such as step 34, there are a large number of periods of the transmission modulation curve 34a within each wavelength range, whereas when the step is small, such as step 36, one cycle of the modulation function 36a, may extend over a wide wavelength range. Furthermore, as explained above, the positions of each of the curves can be independently shifted along the wavelength scale by application of common phase shifts to both pixels of the relevant pixelated phase shifting units 37, 38, 39. As further explained hereinabove, the unperturbed amplitude of each curve is dependent on the area of the step associated with that curve, as a fraction of the unstepped area. When a differential phase shift is applied to the two pixels under a given step, the effect of each of the pixels in association with their sections of the step, results in curves of equal amplitude but shifted relative to each other according to the differential phase shift applied to the pixels. Vector addition of these two curves results in one curve, equivalent to that of the unperturbed step, whose amplitude is dependent on the differential phase shift applied, and which can be independently reduced from its maximum value to zero as the differential phase shift is varied from zero to $\pi$.

The stepped substrate device shown in FIG. 7 can thus be used to construct a transmissive optical component having a desired spectral transmission function, by selection of the substrate steps of the correct predetermined height and surface area, and, if necessary, by the application of the correctly selected additional phase shifts by means of the controllable phase shifting elements. The superposition of the interference curves from all of the predefined steps thus builds a predefined transmission curve as a function of wavelength. Such a process is equivalent to the construction of the curve from its Fourier components, with the wavelength of each Fourier component being determined by the effective height of each step, and the amplitude of each Fourier component being determined by the effective area of each step. The transmission curve can be represented mathematically as the transfer function between the Fourier transforms of the input and the output optical signals, and is expressed as the division of the Fourier components of the two optical signals, as functions of their wavelength and amplitude. The terms effective height and effective area are used to respectively describe the physical height and area of the steps, as amended phase-wise by the application of voltages to the phase shifting elements.

In practical application, the areas of the steps must be kept small to ensure that cross-terms resulting from interference between steps, rather than interference between the steps and the unstepped substrate, be kept to a minimum. Furthermore, the unstepped area should be kept large, to ensure an adequate transmission level when all of the steps are cancelled by setting their phase shifter pixels to provide antiphase transmission through each step.

It is the use, according to the various above-described preferred embodiments of the present invention, of pixeleted, thin, planar liquid crystal cells disposed in series with separate stepped optical paths of a substrate, that allows the implementation of spectral profile modification by the simple application of predefined control voltages to standard liquid crystal cells. This structure is significantly simpler to construct and to operate than the prior art dynamically tuned filters described in the above-mentioned U.S. Pat. No. 6,046,854.

The preferred devices of the present invention differ from these prior art devices, in two aspects: (i) the use of pixelated liquid crystal elements, which is equivalent to the ability to dynamically control the area of each step, and (ii) the application of such elements to a number of separate stepped optical paths, which is equivalent to the ability to dynamically control the height of each step separately. It is this combination which provides the significantly improved flexibility in filter profile design in comparison with the prior art designs, wherein a non-pixelated phase changing element is used on one step of the optical path only, this being equivalent to the ability to control the height of one step only. This prior art, single-step height control is able to provide only very narrow tunability, and is unable to provide complex spectral profiles, since the change of single step height is operative effectively to change only the periodicity of the interference pattern shown in FIG. 2, but not its position or profile.

Figure 9A:
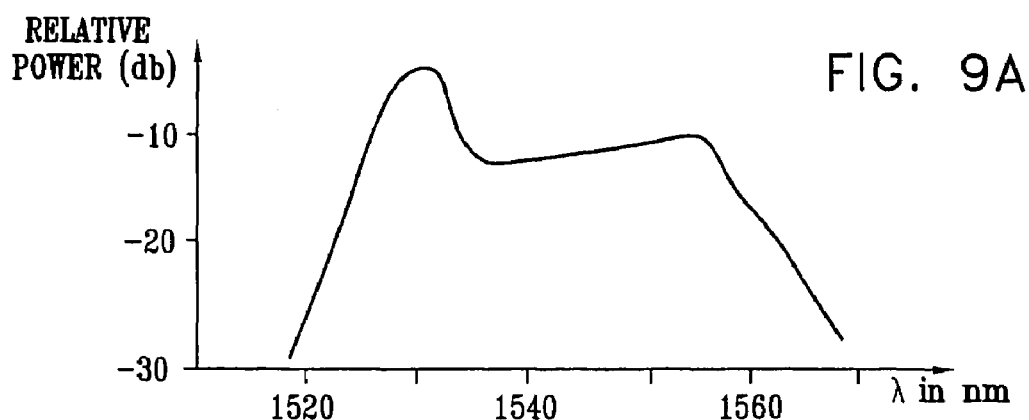
FIG. 9A is a schematic representation of the power spectrum of a fiber optical source of power, such as an erbium-doped fiber amplifier (EDFA)

Reference is now made to FIG. 9A, which is a schematic representation of the power spectrum of a source of optical power, such as, for instance, an erbium-doped fiber amplifier (EDFA), as commonly used as the source of power in C-band fiber optical communications systems. The example of the output of an EDFA is used in this specification to illustrate some of the applications in the field of optical signal amplitude processing, of devices constructed and operative according to various preferred embodiments of the present invention. In such communications systems, it is often necessary to perform power adjustment operations on the output signals. It is to be understood though, that the EDFA output signal applications are used only as examples of the capabilities of preferred devices according to the present invention, and that the invention is equally applicable to other sources and other wavelength ranges of operation.

Power leveling, to optimize the spectral power budget within the system, is a common operation used in power level management in optical communication systems, and a gain equalizer is used to perform this operation. The spectral transmission characteristics of an optical communications link can be affected by many factors, both long term and short term. In general, each EDFA unit produced, even from the same production batch, may have a slightly different power spectrum and may have different input characteristics as a function of power input and wavelength. Consequently, changes in the amplitude or wavelength of the input signal to the EDFA, changes in environmental conditions, and also longer term changes arising from aging of the amplifier can cause the spectral characteristics of the output optical signal to change dynamically. Therefore, the gain equalizer must be capable of dynamic adjustment to adapt itself to the initial and to the changing characteristics of each EDFA, and to changes in the transmission characteristics.

Figure 9B:
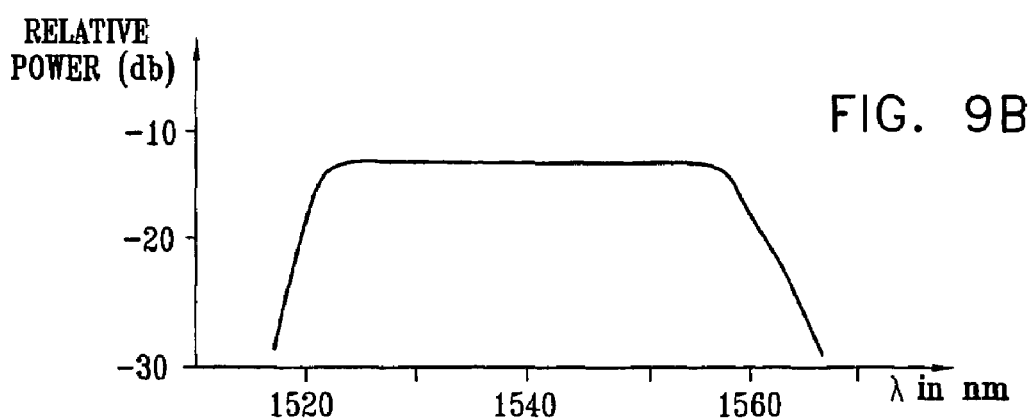
FIGS. 9B to 9D are examples of spectral profiles achievable from the input spectral profile shown in FIG. 9A, according to various preferred embodiments of the present invention.

The characteristic power spectrum obtained at the EDFA output, as typically shown in FIG. 9A, can be Fourier analyzed in order to extract the Fourier components of the curve, including their wavelengths and amplitudes. These components can then be used in order to construct a transmissive optical component, such as that shown in FIG. 7, wherein each of the steps is operative to simulate the effect of one of the Fourier components of the EDFA power spectrum. According to a first preferred embodiment of the present invention for use in this application, the steps are constructed to approximately flatten the spectral profile of the source, according to the average profile obtained. Fine tuning is then applied by adjustment of the control signals on the pixelated phase shifters associated with each step, in order to obtain a better level of flattening, and thus to compensate for the minor changes between different EDFA's and their operational conditions. The limit of the flatness achievable is on the number of steps used in the gain equalizer. The result of this process is shown in the typical spectral profile schematically displayed in FIG. 9B.

According to another preferred embodiment of the invention, the gain equalizer can be dynamically tuned, by adjustment of the control signals on the pixelated phase shifters associated with each step. The adjustment is made in accordance with a feedback signal obtained from channel power monitoring, in order to determine in which wavelength regions the output is changing, and by how much. In this way, it is possible to compensate for changes in the spectral profile due to operational or environmental changes. The output of the EDFA, after passage through the gain equalizer, can thus be maintained effectively flat at all times.

Figure 9C:
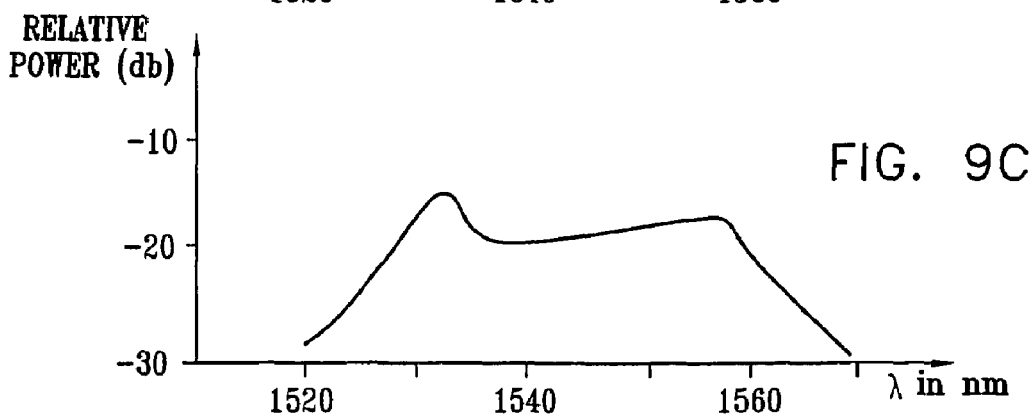

According to yet another preferred embodiment of the invention, when the pairs of pixels on every step are driven in antiphase, the component does not introduce spectral changes to the EDFA output, but simply reduces the output uniformly across its spectrum. When the beams through each of the halves of each step are all in anti-phase, then the attenuation is at a maximum, as defined by the insertion loss of the device. The component can thus be used as a wavelength independent attenuator. A typical example of the output of such a component is shown schematically in FIG. 9C, which should be compared with the input spectrum of FIG. 9A.

Figure 9D:
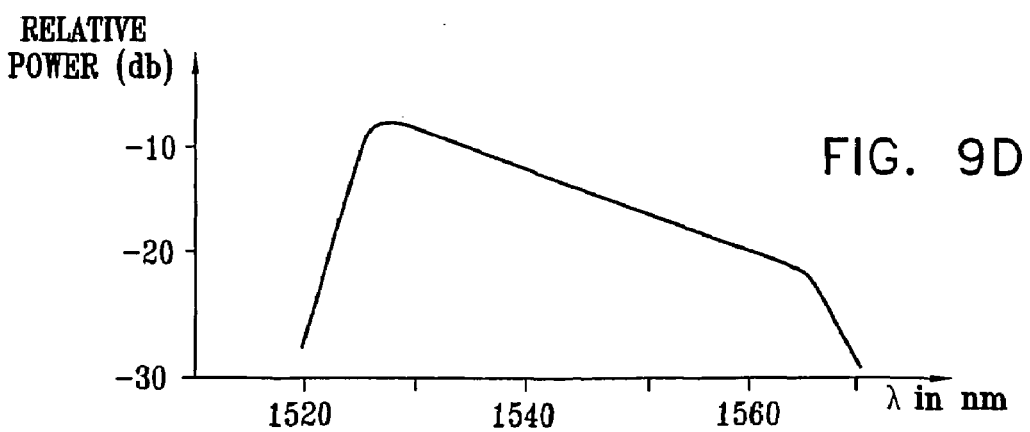

According to another preferred embodiment of the invention, the control voltages applied to the phase shifting elements are adjusted to be such as to enable the synthesis of a predefined spectral profile. This application is useful for generating power spectra which precompensate for the spectral response of the system into which they are working. Thus, for instance, if it is known that higher frequencies are attenuated in a certain transmission network, it is possible using this preferred embodiment to taper the power profile to provide more power output at the high frequency end of the wavelength range used. Such an output profile is illustrated in the typical spectral power profile shown in FIG. 9D.

Figure 10:
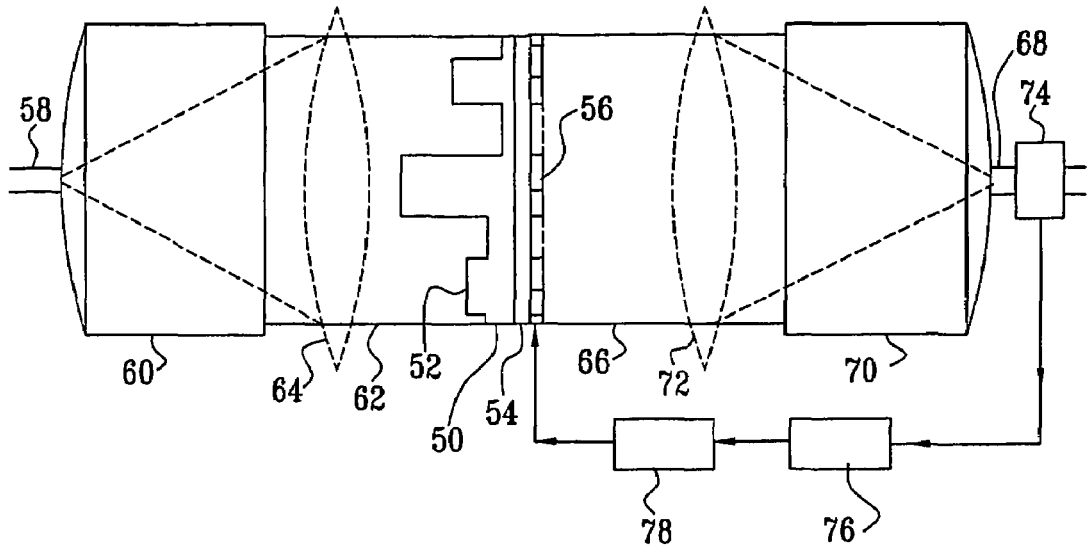
FIG. 10 is a schematic illustration of a transmissive fiber optical gain equalizer, constructed and operative according to a preferred embodiment of the present invention.

Reference is now made to FIG. 10, which is a schematic illustration of a fiber optical gain equalizer, constructed and operative according to a preferred embodiment of the present invention. The gain equalizer utilizes a stepped transmissive substrate 50, which can preferably be made of glass or quartz to provide mechanical and optical stability. The number of steps 52, and their heights and areas are selected according to preferred methods of the present invention as described hereinabove. A liquid crystal element 54 is disposed, preferably close to the non-stepped face of the substrate, and may be attached thereto adhesively for stability and ease of construction. Separate pixelated electrodes 56 are applied to the liquid crystal element at locations opposite the steps, the pixels of each separate electrode being of essentially equal area. Change of the control voltages on the pixelated electrodes causes changes in the phase of the light transmitted through the steps, in the same way as described hereinabove. The electrodes and their address leads are constructed of a transparent conductive material, as is known in the art, to avoid interference with the optical transmission through the device.

The optical signal is input to the gain equalizer through a fiber 58, which terminates in a GRIN lens rod 60, which outputs the optical signal as a collimated beam 62. Alternatively and preferably, the input fiber can terminate in free space, and the beam diverging therefrom be collimated by means of a positive lens 64. This alternative input arrangement is shown in dotted outline in FIG. 10. After traversing the stepped substrate assembly, the amplitude processed beam of collimated light 66 is refocused into the output fiber 68 by means of another GRIN rod lens 70, or by means of a free space lens 72. The use of a collimating element, whether a free-space lens or a GRIN rod lens, enables the interference pattern generated at optical infinity by the beam passing through the stepped and the unstepped parts of the substrate, to be correctly input to the output fiber 68.

The signal passing down the output fiber is sampled, preferably by means of a directional coupler 74, and the spectral content of the signal determined preferably using a channel power monitor 76. The signals from this channel power monitor are passed to a processing unit 78, where the levels of each of the selected Fourier wavelength components of the actual output beam are compared with those of the desired output beam spectral profile. The required feedback control signals are then generated for driving the pixelated electrodes of the liquid crystal element such that the output of each channel reaches its desired level. The feedback signal incorporates information for correcting the amplitude and comparative phase of each of the selected Fourier wavelength components of the output signal to achieve the desired spectral profile. Some of the various types of output spectral profiles that can be achieved have been illustrated and explained in connection with FIGS. 9B to 9D.

According to further preferred embodiments of the present invention, the signal sampling can be performed anywhere in the optical communications channel where the power level is to be monitored. The signal monitoring can even be performed remotely from the gain equalizer, such as at the receiver station or at an en-route repeater unit, either of which could be at a considerable distance from the gain equalizer itself. In this way, the gain equalization is performed on the basis of the signal strengths of each channel detected at the destination point of the signal, where gain equalization is important for optimizing the system power budget.

Figure 11:
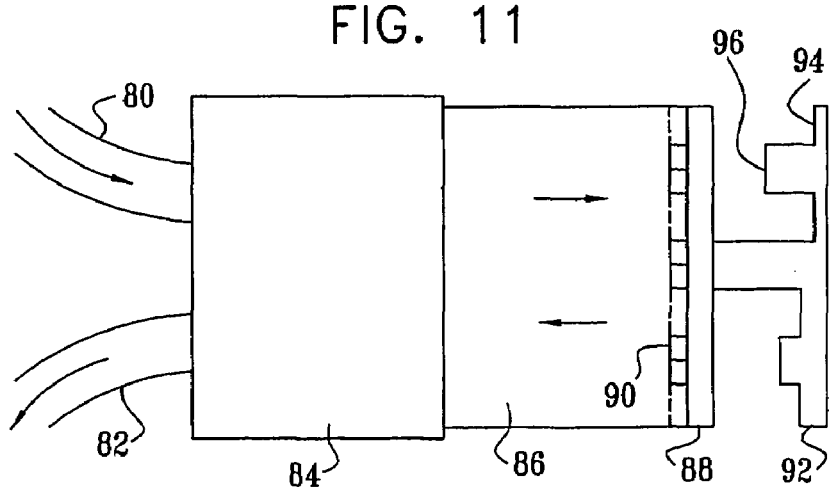
FIG. 11 is schematic illustration of a reflective fiber optical gain equalizer, constructed and operative according to another preferred embodiment of the present invention.

The embodiment of this invention illustrated in FIG. 10 is a transmissive gain equalizer. Reference is now made to FIG. 11, which schematically illustrates a gain equalizer, according to another preferred embodiment of the present invention, but in which the light is reflected through the stepped substrate. In this case, the optical path difference through the steps is doubled, since the light passes twice down the length of each step, and the step heights can therefore be halved in comparison with the transmissive embodiment shown in FIG. 10.

In FIG. 11, the input fiber is connected to one fiber of a dual fiber collimator 84, which converts the signal into a collimated beam 86. The dual fiber collimator 84 may either be a GRIN rod component, as shown in FIG. 11, or it may be implemented in a free space embodiment using the two ends of the input and output fiber positioned at the focal plane of a collimating lens, in a similar manner to the dotted embodiment shown in FIG. 10. The beam preferably passes through the liquid crystal element 88 with transparent pixelated electrodes 90 attached thereto for spatially controlling the phase shift applied to the light passing through. In this reflective embodiment, the stepped substrate can take a number of alternative forms. According to the simplest preferred form, as shown in FIG. 11, the stepped substrate 92 need not be transparent since the substrate has a reflective layer 94 on its top side, which covers both the steps themselves, and the remaining unstepped surface of the substrate, such that the light does not even enter the substrate. The stepped substrate thus acts as a stepped mirror, reflecting the light back from the substrate down different path lengths in the air spaces between the liquid crystal device and the mirror steps. It is thus the air spaces, with their unity refractive index, which must be used in calculating the interference resulting from the phase shifts engendered by the stepped structure. The advantage of this embodiment is that the stepped substrate can be constructed of a molded material, such as a stable epoxy material, or a suitable thermosetting plastic, with the concomitant savings in construction cost over a precision ground glass or quartz substrate.

According to a further preferred embodiment, the substrate can be a transmissive element, similar to that used in the previously shown embodiments in this specification, and the reflective coating applied to the smooth bottom surface of the substrate. In this case, the calculation of the phase shifts from the steps is similar to that of the transmissive embodiments, except for the halving of the step heights as previously mentioned.

The reflected intensity processed collimated beam is output from the gain equalizer through the second fiber 82 of the dual beam collimator. The signal channel monitoring means, and the way in which the different wavelength channel signals are used to control the phase shifter pixels are essentially similar to those described in the transmissive embodiment of FIG. 10.

Figure 12:
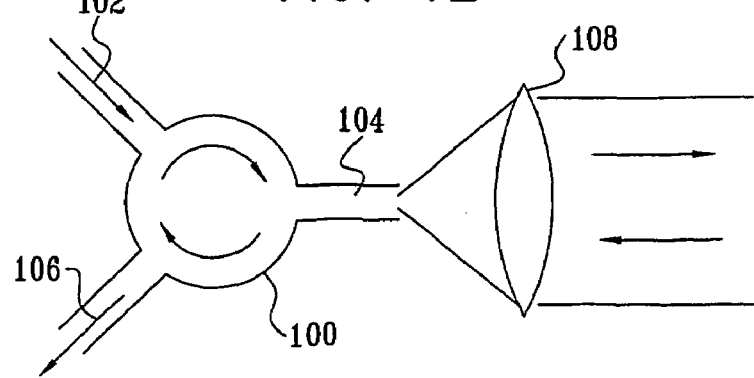
FIG. 12 is a schematic illustration of an alternative preferred signal input and output arrangement for the gain equalizer shown in FIG. 11, using a circulator to direct the input and output signals.

Reference is now made to FIG. 12, which is a schematic illustration of an alternative preferred signal input and output arrangement for the gain equalizer shown in FIG. 11. According to this preferred embodiment, a circulator 100 is used to direct the input signal from the input fiber 102 to the equalizer port 104, and the reflected processed signal from the equalizer port 104 to the output fiber 106. In the embodiment shown in FIG. 12, a collimating lens 108 is preferably used to configure the input beam for transmission through the stepped substrate from the beam issuing from the end of the circulator output port fiber 104, in a similar manner to the embodiment shown in dotted outline in FIG. 10.

The devices described in the above-mentioned preferred embodiments of the present invention, have been directed at applications where dynamic control of the spectral properties of the light signals transmitted the device is desired, such as in a dynamic gain equalizer. For this purpose, variable controllable phase-shifting elements are incorporated in at least some of the stepped optical paths. According to a further preferred embodiment of the present invention, there is provided a static spectral optical profiler, in which the spectral properties of the incoming signal are amended in a predetermined and fixed manner. Such a device is shown, in its simplest form, in FIG. 1, with a single stepped substrate. More complex examples are shown in any of the multi-stepped substrate embodiments described elsewhere in this specification, such as in FIGS. 7, 10 and 11, but with the absence of the variable phase shifting elements. The spectral modifying characteristics of such a device may be used, for instance, to construct a fixed gain equalizer, useful for flattening the output of devices with a peaked or otherwise undesirable spectral profile. Such spectral adjustment is typically performed currently with a static filter or filters. The static spectral profiler according to this preferred embodiment of the present invention provides an alternative device to a filter, which is of low construction cost, is very stable in its properties and may be of low insertion loss. The stability arises from the fact that the properties of the device are dependent only on the dimensions of the substrate, and the value of its refractive index, both of which can be very stable. The construction costs can be particularly low if the profile modifier is of the reflective type as described hereinabove, and is preferably constructed of a molded transparent epoxy or another plastic material, with a reflective coating on the rear surface.

In all of the above-described embodiments, the stepped substrate of the gain equalizer operates in an essentially polarization independent manner, since a birefringent substrate material would not generally be used. However, the phase shifting elements associated with each step may have polarization dependence. If these elements are, for instance, liquid crystal devices, then it is possible to eliminate any polarization dependence arising from these elements by any of the methods described in co-pending Israel Patent Application No. 142,773.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An optical device comprising:
   an input fiber for inputting an input optical signal;
   an output fiber for outputting an output optical signal;
   an optical path between said input fiber and said output fiber;
   a substrate comprising at least one step with predefined parameters, said at least one step being disposed in part of said optical path and adding a phase shift to light passing therethrough; and
   a variable phase shifting element controlled by an applied signal, disposed serially with said at least one step in said part of said optical path, and pixilated such that it shifts the phase of light passing through at least a portion of said part of said optical path;
   such that the optical interference between light traversing that part of said optical path containing said at least one step and light traversing those parts of said optical path not containing said at least one step results in a wavelength dependent transmission through said device.

2. An optical device according to claim 1 and wherein the phase shifts in said part of said optical path containing said at least one step are selected such that the said device has a predetermined spectral transmission profile.

3. An optical device according to claim 1, wherein said variable phase shifting element is a liquid crystal device.

4. An optical device according to claim 1, wherein said input fiber and said output fiber are disposed such that light passes from said input fiber to said output fiber by transmission through said optical path.

5. An optical device according to claim 1, and also comprising a reflecting surface associated with said substrate, and wherein said input fiber and said output fiber are disposed such that light undergoes reflection between them.

6. An optical device according to claim 1, and also comprising a circulator and a reflecting surface, and wherein said input fiber and said output fiber are connected to two ports of said circulator, and said substrate and associated reflecting surface are disposed at a third port of said circulator.

7. An optical device according to claim 1, and operative as a gain equalizer.

8. An optical device according to claim 1, and wherein said parameters are at least one of the optical cross section and the height of said at least one step.

9. An optical device according to claim 1, and wherein said applied signal is adjusted according to the spectral profile of said output optical signal, such that said optical device modifies the spectral transmission profile of said optical path dynamically.

10. An optical device according to claim 9, and also comprising a channel monitor monitoring said output signal, and wherein said applied signal is obtained from said channel monitor.

11. An optical device according to claim 9, and wherein said optical device compensates for changes in the spectral profile of said input signal dynamically.

12. An optical device according to claim 9, and wherein said applied signal is dependent on the effective wavelength and amplitude of those of the Fourier components of the spectral profile of said output optical signal, which are associated with said at least one stepped area of said substrate.

13. A method of adjusting the spectral transmission profile of an optical path, comprising the steps of:
   providing an input fiber for inputting an input signal to said path;
   providing an output fiber for outputting an output signal from said path;
   disposing a substrate having at least one stepped area with predefined parameters in said optical path;
   disposing a variable phase shifting element controlled by an applied signal, serially with said at least one stepped area in said optical path, said element being pixilated such that it shifts the phase of light passing through at least a portion of said part of said optical path; and
   adjusting said applied signal such that the optical interference between light traversing said at least one stepped area and light traversing those parts of said optical path not containing said at least one stepped area produces the desired spectral transmission profile of said optical path.

14. A method according to claim 13, and wherein said parameters are at least one of the optical cross section and the height of said at least one stepped area.

15. A method according to claim 13, wherein said controllable phase shifting element is a liquid crystal device.

16. A method according to claim 13, wherein said input fiber and said output fibers are disposed such that light passes from said input fiber to said output fiber by transmission through said optical path.

17. A method according to claim 13, and also comprising the additional step of providing a reflecting surface associated with said substrate, and disposing said input fiber and said output fibers such that light undergoes reflection between them.

18. A method according to claim 13, and also comprising the additional steps of providing a circulator and a reflecting surface, and connecting said input fiber and said output fiber to two ports of said circulator, and said substrate and associated reflecting surface to a third port of said circulator.

19. A method according to claim 13, and wherein said applied signal is adjusted according to the spectral profile of said output optical signal, such that said optical device modifies the spectral transmission profile of said optical path dynamically.

20. A method according to claim 19 and also comprising the step of channel monitoring said output signal, and wherein said applied signal is derived from said channel monitoring.

21. A method according to claim 19, and wherein said step of adjusting said applied signal compensates for changes in the spectral profile of said input signal dynamically.

22. A method according to claim 19, and also comprising the step of determining the Fourier components of the spectral profile of said output optical signal, and wherein said applied signal is adjusted according to the effective wavelength and amplitude of those of the Fourier components of the spectral profile of said output optical signal, which are associated with said at least one stepped area of said substrate.

23. A method of changing the spectral profile of an input optical signal to a predetermined profile, comprising the steps of:
  determining the effective wavelengths and amplitudes of a predetermined number of Fourier components of the spectral profile of said input optical signal;
  determining the effective wavelengths and amplitudes of said predetermined number of equivalent Fourier components of said predetermined spectral profile;
  calculating a transfer function according to the ratio of each of said predetermined number of Fourier components of the spectral profile of said input optical signal to each of said predetermined number of Fourier components of said predetermined profile;
  providing a substrate having a plurality of stepped areas, one stepped area for each determined Fourier component; and
  passing said input optical signal through said substrate;
  wherein the height of each of said stepped areas is predetermined according to the wavelength of said transfer function associated with its stepped area, and the area of each of said stepped areas is predetermined according to the amplitude of said transfer function associated with its stepped area.

24. The method of claim 23 and also comprising the step of providing a variable phase shifter disposed across the cross section of at least one of said stepped areas, and wherein adjustment of said phase shifter varies the wavelength of that component of said transfer function associated with said stepped area.

25. The method of claim 23 and wherein said variable phase shifter is pixilated, and wherein the generation of differential phase shifts by said pixels varies the amplitude of that component of said transfer function associated with said stepped area.

* * * * *